United States Patent [19]

Schumacher et al.

[11] Patent Number: 4,966,611

[45] Date of Patent: Oct. 30, 1990

[54] REMOVAL AND DESTRUCTION OF VOLATILE ORGANIC COMPOUNDS FROM GAS STREAMS

[75] Inventors: John C. Schumacher, Carlsbad; Joseph C. McMenamin, Oceanside; Lawrence B. Anderson, Encinitas, all of Calif.; Harold R. Cowles, Chandler, Ariz.; Stephen M. Lord, Encinitas, Calif.

[73] Assignee: Custom Engineered Materials Inc., Oceanside, Calif.

[21] Appl. No.: 326,908

[22] Filed: Mar. 22, 1989

[51] Int. Cl.$^5$ ............................................. B01D 53/04
[52] U.S. Cl. .......................................... 55/20; 55/62; 55/74; 55/163; 55/179; 55/208; 55/270; 55/387
[58] Field of Search .................... 55/20, 21, 59, 62, 74, 55/162, 163, 179, 180, 208, 387, 75, 389, 270, 274

[56] References Cited

U.S. PATENT DOCUMENTS

| | | | |
|---|---|---|---|
| 2,211,162 | 8/1940 | Ray et al. | 55/59 X |
| 3,087,291 | 4/1963 | Jackson et al. | 55/179 X |
| 3,455,089 | 7/1969 | Mattia | 55/62 |
| 3,494,102 | 2/1970 | Dunn, Jr. | 55/62 |
| 3,534,529 | 10/1970 | Mattia | 55/180 X |
| 3,902,874 | 9/1975 | McAndrew | 55/180 X |
| 4,021,211 | 5/1977 | Turek et al. | 55/59 X |
| 4,047,904 | 9/1977 | Worrall | 55/179 X |
| 4,190,423 | 2/1980 | Winter | 55/62 X |
| 4,197,095 | 4/1980 | White, Jr. et al. | 55/162 X |
| 4,231,764 | 11/1980 | Mattia | 55/62 X |
| 4,409,006 | 10/1983 | Mattia | 55/62 X |
| 4,414,003 | 11/1983 | Blaudszun | 55/208 X |
| 4,565,553 | 1/1986 | Nowack | 55/59 |
| 4,689,054 | 8/1987 | Vara et al. | 55/62 X |
| 4,738,694 | 4/1988 | Godino et al. | 55/179 X |

FOREIGN PATENT DOCUMENTS 2134632 1/1973 Fed. Rep. of Germany .......... 55/62
2712250 9/1978 Fed. Rep. of Germany ........ 55/163

OTHER PUBLICATIONS

AMCEC Corp., Oakbrook, Ill., Release-AMCEC Scope of Work.
Wayne Schuliger, Controlling Low Concentrations of Volatile Organic Compounds Using Granular Activated Carbon, 4/24–26/83, Bulk Pharmaceuticals, Kalamazoo, Mich.
J. Nemeth, T. Virag, Continuously Operating Adsorbers with Activated Carbon for Vapor Recovery, 1984, Acta Chimica Hungarica 115 (3), pp. 273-287.
Paul N. Chereminisoff, Volatile Organic Compounds, 3/85, Pollution Engineering.
John von Bargen, John Quiel, Wayne Schuliger and Paul Sengupta, Carbon Adsorption Thermal Oxidation (Hybrid System), 6/16–21/85, 78th Annual Meeting of the Air Pollution Control Association, Detroit, MI.
Paul N. Chereminisoff, Solvent Vapor Recovery and VOC Emission Control, 6/86, Pollution Engineering.

Primary Examiner—Robert Spitzer
Attorney, Agent, or Firm—Knobbe, Martens, Olson & Bear

[57] ABSTRACT

An apparatus and process for adsorbing volatile organic compounds, or VOCs, and efficiently regenerating adsorbent material in an emission control system. Flue gas, emitted from a combustion unit burning an outside fuel and desorbed VOCs, is humidified and cooled with a set of water injectors. The resultant humidified flue gas is directed through the adsorbent material, which is rapidly superheated without pressurization. A method for controlling the regeneration cycle of the emission control system includes at least three sensor configurations including a breakthrough sensor, a desorbed gas sensor and a flue gas temperature sensor.

19 Claims, 2 Drawing Sheets

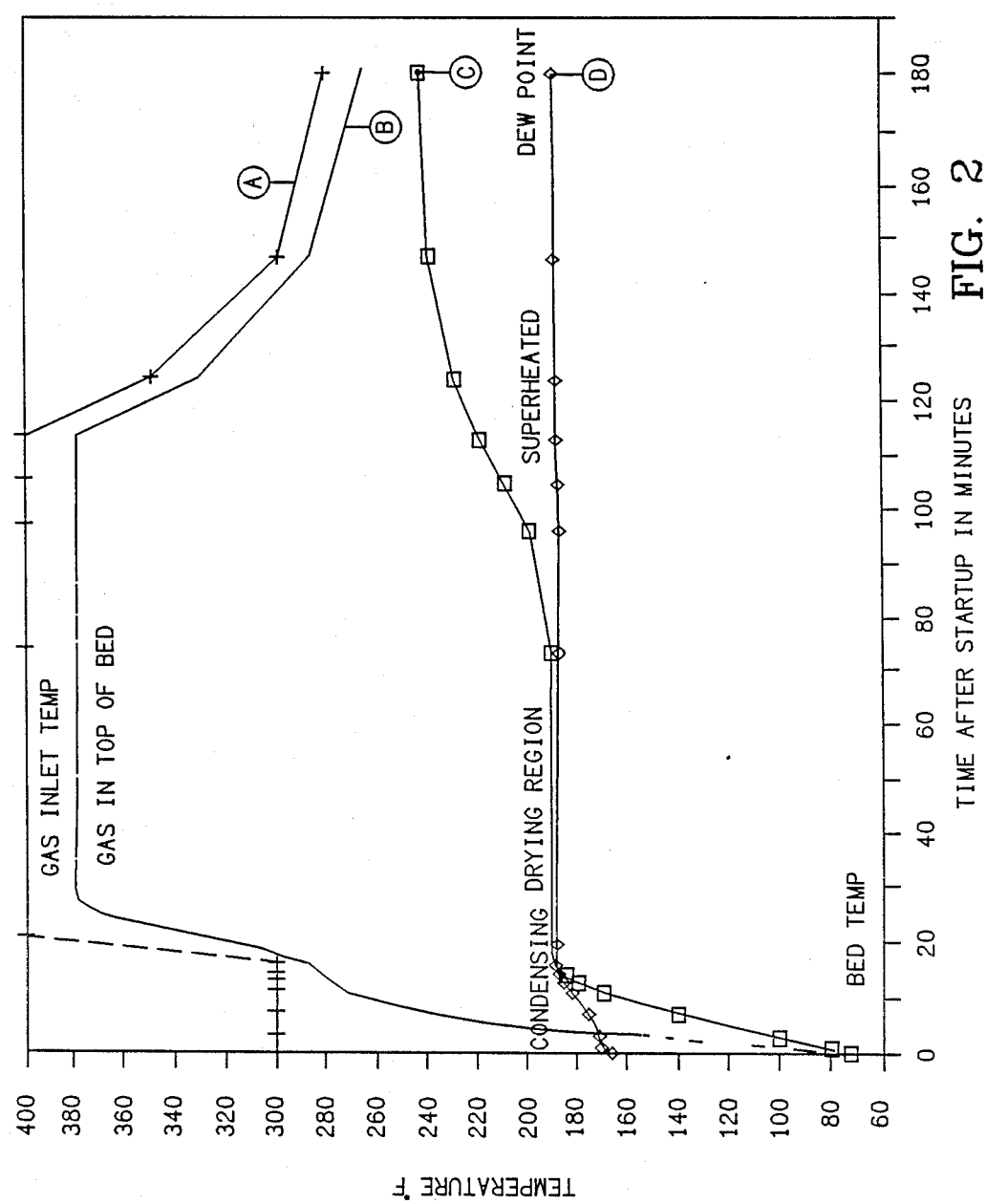

REMOVAL AND DESTRUCTION OF VOLATILE ORGANIC COMPOUNDS FROM GAS STREAMS

BACKGROUND OF THE INVENTION

1. Field of the Invention

The present invention generally relates to industrial emission control systems and, more particularly, is concerned with an apparatus and process for removing and destroying volatile organic compounds by heating adsorbent material with a humidified flue gas to release sorbed compounds whereafter the compounds are burned. The present invention also relates to a method for controlling the regeneration of an adsorbent material by monitoring a regeneration variable such as flue gas temperature and, based thereon, controlling the burning of an outside fuel in combination with desorbed volatile organic compounds.

2. Description of the Prior Art

A daily news barrage about the health hazards of living in an industrialized world, hazards due to such things as urban smog, acid rain and ozone depletion, has heightened our awareness of the fragile ecosphere mankind inhabits. The uneasiness of the general public with respect to destruction of the environment has led national and state governments to revitalize scrutiny of industrial pollution. Airborne emissions in industrial environments are typically limited by considerations of personnel or equipment protection, public nuisance, government regulations and economics. Because the former two considerations are often anticipated by government regulations, it is principally the latter two considerations which influence the design of emission control systems. Unfortunately, regulations and economics are typically at odds with one another and therefore must be balanced. With respect to the present invention, the tradeoffs in specifying emission control systems for the removal of volatile organic compounds from contaminated gas streams are challenging, and they effect many segments of our economy.

Volatile organic compounds (VOCs) include hydrocarbons such as ethers, esters, ketones, aldehydes and alcohols. Industrial plants which vent these types of organic compounds, or solvents, into the atmosphere are coming under increasingly stringent emission standards, such as those recently enacted by the state of California. These regulatory and economic burdens are shared by a spectrum of industrial users including, for example, semiconductors, paint manufacturing, fiberglass molding operations, dry cleaning, auto and appliance paint baking and textiles, to name just a few.

In such industries, recycling and direct incineration of VOCs are completely satisfactory options for reducing VOC emissions. However, due to low volumetric ratios of solvent vapors in gas streams, reuse and resale of recovered solvents is not always economically feasible. Direct incineration of these vapors may also be impractical because of low VOC concentrations in conveying gas streams.

The most satisfactory solution for controlling industrial VOC emissions, however, seems to focus on a two-step process of first concentrating the solvent vapors with adsorbent materials such as activated carbon, and then regenerating the adsorbent materials, burning off the concentrated vapors in the process. The adsorption of volatile organic compounds relies on blowing a contaminated gas stream across, or through, a carbon bed prior to releasing the stream into the atmosphere. Over time, the carbon bed becomes saturated with VOCs and therefore must be either replaced or regenerated. When a carbon bed is regenerated, the concentrated VOCs are "boiled" off and then the activated carbon is reused. Regeneration of an activated carbon adsorbent is best accomplished by heating the carbon bed to around 280° F. at steady state. In most present systems the bed is heated with hot air. The concentrated sorbed hydrocarbons thus released are then destroyed by burning in a combustion unit, usually in combination with an outside fuel.

Since adsorption and regeneration are independent steps, VOC contaminated gas streams contacting an adsorbent cannot be filtered for VOCs concurrently with regeneration of the same adsorbent. Instead, each adsorbing cycle is followed by a regenerating cycle. Therefore, most present emission control systems employ two adsorbent containers, or adsorbers, connected to two plumbing systems corresponding to the adsorption and regeneration cycles. With this configuration, one self-contained system in on-line adsorbing mode can operate in tandem with another self-contained system in off-line regeneration mode. After sufficient operating time, to allow accumulation of VOCs in the adsorbent material of the on-line adsorber, valves are used to redirect the plumbing systems between the two adsorbent containers and afterwards, the on-line adsorber becomes the off-line adsorber and visa versa.

An example of one such volatile organic compound emission control system is disclosed by Mattia (U.S. Pat. No. 3,455,089). The Mattia patent shows a portion of an enriched regeneration gas being passed as a slipstream to either an air incinerator or catalytic combustion chamber, therein to be burned. Natural gas may be added to the enriched regeneration gas if combustion is not otherwise possible. To release sorbed compounds, outside air, or make-up regeneration air, is heated with a heat exchanger prior to contacting an adsorbent material. Steam may be introduced to control the humidity of the make-up regeneration air.

While the Mattia emission control system, or other variations, have been used successfully in the past, the technique of using outside air and steam to heat adsorbents has its shortcomings. First, in these systems, outside air is heated with heat exchangers which derive heat from combustion gases generated from an air incinerator or catalytic combustion chamber. Heat exchangers add cost and bulk to the overall emission control system. Second, using steam to humidify the outside air shares a common problem with scrubbers: the water which condenses is polluted, and such effluent must itself be safely disposed of. Furthermore, steam in present VOC emission control systems is generated by boilers, system components which in turn must be fueled. Moreover, steam temperatures above 212° F. are only achieved by superheating, which requires a pressurized system at dramatically increased cost. Third, lacking from present emission control systems is a way of combining the primary advantage of hot air, to heat the adsorbent to temperatures above 212° F., with the primary advantage of steam, quick adsorbent heat-up.

Consequently, a need exists for improvements in adsorbent type emission control systems for volatile organic compounds which will result in eliminating heated outside air and heat exchangers, safely and inexpensively using water to humidify hot air, eliminating inefficiencies caused by generating steam, and providing a quick adsorbent heat-up to temperatures above 212° F.

SUMMARY OF THE INVENTION

To satisfy the aforementioned needs, the present invention provides an apparatus and process for controlling emissions of volatile organic compounds which includes the regeneration of adsorbent material by rapid and controlled heating with humidified flue gas. The present invention generates a flue gas from a combustion unit by burning desorbed compounds. The flue gas is humidified and cooled by water injection, and the humidified flue gas is directed to, and thus heats, an adsorbent material. At the beginning of the regeneration cycle, an outside gas is used for combustion fuel; however, gradually the sorbed compounds are added as combustion fuel and burned away in a controlled manner. After the rapid heat-up of the adsorbent material by condensing flue gas, the adsorbent material is dried to a temperature above the boiling point of water.

Accordingly, the present invention relates to an emission control system which includes a unique process for removing volatile organic compounds from gas streams. The process is separated into two cycles: an adsorption cycle and a regeneration cycle. The process requires that a gas stream contact an adsorbent material during adsorption; that the adsorbent material be heated by a humidified flue gas during regeneration; and that the resulting compounds desorbed from the heated adsorbent material be burned in a combustion unit during regeneration. The combustion unit burns a mixture of an outside fuel such as natural gas and desorbed compounds produced from the regeneration cycle. Preferably, two water injectors are used to humidify the flue gas with deionized water, thereby bringing the flue gas to an optimal temperature for heating the adsorbent material. The adsorbent material is typically an activated carbon. The carbon is heated by condensing moisture from the humidified gas until it reaches dew point. By continuing to heat the moisturized carbon above dew point, the carbon is dried and is therefore able to efficiently achieve a temperature greater than 212° F. without use of a pressured system.

The present invention also includes a method to control the regeneration of adsorbent material. The outside fuel is first burned alone in a sufficient quantity to heat the flue gas to a predetermined temperature for optimal desorption of VOCs. The flue gas is directed through the adsorbent material and the desorbed compounds are directed to the combustion unit. Flue gas temperature is monitored and the amount of outside fuel is gradually reduced to maintain the desired flue gas temperature.

The present invention also includes an apparatus which preferably has the following components: (1) two adsorbent chambers, (2) a first set of pipes for directing a gas stream through the adsorbent chambers, (3) a combustion unit, (4) a flue, (5) two water injectors, (6) a second set of pipes for directing desorbed compounds to the combustion chamber, (7) an ignition source and (8) a valving arrangement to meter natural gas and desorbed compounds.

One of at least three types of sensors can be added to the apparatus to provide feedback to the adsorbent regeneration cycle. In a first apparatus configuration, a sensor measures amounts of volatile organic compounds leaving the adsorbent material. With this information, regeneration is directed with preprogrammed timed events based on the initial level of compounds in the adsorbent material. In a second configuration of the apparatus, a sensor, for example, an infrared detector, continuously measures amounts of desorbed compounds released from the adsorbent. This information is used to control the mixture of outside fuel and desorbed compounds entering the combustion unit. In a third apparatus configuration, a sensor continuously measures the temperature of the flue gas. The sensor data is used to control the proportions of outside fuel and desorbed compounds being burned.

Thus, in more detail, the present invention particularly includes the following:

In accordance with one embodiment of the invention, there is provided an emission control process for removing and concentrating volatile organic compounds from a gas stream, in an apparatus including a combustion unit and a flue, comprising the steps of contacting the gas stream with an adsorbent material to remove the volatile organic compounds therefrom, and thereafter heating the adsorbent material with a humidified flue gas to release a stream of desorbed volatile organic compounds, and burning the stream of desorbed volatile organic compounds in the combustion unit and discharging a combustion gas into the flue. The flue gas may be humidified with water injection, and preferably with deionized water. Preferably, the water injection comprises the steps of injecting a first stream of water inside of the flue, and injecting a second stream of water between the flue and the adsorbent material. The first stream of water may be injected in sufficient amount to generate the humidified flue gas at a first predetermined temperature and the second stream of water may advantageously be injected into at least a portion of the humidified flue gas to reduce the temperature of the humidified flue gas to a second predetermined temperature prior to contacting the adsorbent material. The adsorbent material is preferably carbon. In a preferred embodiment, an outside fuel such as natural gas is mixed with the stream of desorbed volatile organic compounds to obtain a combustible fuel mixture to burn in the combustion unit. In a variation of the process, the heating of the adsorbent material comprises the steps of condensing the humidified flue gas on the adsorbent material so as to release latent heat, thereby rapidly heating the adsorbent material until the adsorbent material reaches its dew point, and continuing to heat the adsorbent material above its dew point to dry the adsorbent material. The amount of flue gas directed to the adsorbent material may represent only a portion of the flue gas.

In accordance with another aspect of the present invention, there is provided an adsorption/regeneration apparatus for removing and concentrating volatile organic compounds from a gas stream, comprising an adsorber having adsorbent material, means for directing the gas stream through the adsorber to generate a clean air stream, a combustion unit, a flue to emit a flue gas from the combustion unit, one or more water injectors to cool and humidify the flue gas, means for directing the humidified flue gas through the adsorber to heat the adsorbent material and generate a desorbed gas stream, means for burning an outside combustible gas stream, the desorbed gas stream, and mixtures thereof in the combustion unit, and means for mixing the outside gas and the desorbed gas for burning in the combustion unit. The apparatus may advantageously additionally comprise a sensor to measure amounts of volatile organic compounds in the clean air stream output from the adsorber to determine when the adsorbent material is no longer effectively removing volatile organic compounds. It may also advantageously have a sensor to measure amounts of volatile organic compounds in the desorbed gas stream to provide feedback to the mixing means. One appropriate type of sensor is an infrared hydrocarbon sensor. Another type of sensor that may advantageously be used in process control is a sensor to measure the temperature of the flue gas to provide feedback to the mixing means. In one embodiment of the apparatus, the adsorbent material is contained in first and second adsorption chambers, so that material in one chamber can remove volatile organic compounds from the gas stream while the adsorbent material in the other chamber is regenerated. Moreover, the water injectors preferably include a first water injector to inject water inside the flue and a second water injector to inject water between the flue and the adsorber.

Still another aspect of the present invention relates to a method for controlling the regeneration of an adsorbent material having sorbed volatile organic compounds, in an apparatus including a combustion unit capable of burning both an outside fuel and desorbed volatile organic compounds from the adsorbent material, comprising the steps of burning the outside fuel in the combustion unit at a sufficient rate to provide a flue gas temperature exiting the combustion unit within a predetermined range, directing a portion of the flue gas through the adsorbent material to generate a stream of desorbed volatile organic compounds leaving the adsorbent material, directing the stream of desorbed volatile organic compounds into the combustion unit and burning the stream therein, monitoring the flue gas temperature while the combustion unit is burning the volatile organic compounds in the stream, and decreasing the amount of outside fuel burned in the combustion unit, while the volatile organic compounds are being burned, by a sufficient degree to maintain the flue gas temperature within the predetermined range.

This invention also includes an apparatus having an adsorber to remove and concentrate volatile organic compounds from a gas stream, a combustion unit for burning both an outside fuel and volatile organic compounds to provide a hot flue gas to regenerate the adsorber, and a means to control the regeneration, comprising the steps of contacting the gas stream with an adsorbent material to remove the volatile organic compounds therefrom, and thereafter burning the outside fuel in the combustion unit at a sufficient rate to provide a flue gas temperature exiting the combustion unit within a predetermined range, humidifying a portion of the flue gas, directing the humidified flue gas through the adsorbent material to generate a stream of desorbed volatile organic compounds leaving the adsorbent material, directing the stream of desorbed volatile organic compounds into the combustion unit and burning the stream therein, monitoring the flue gas temperature while the combustion unit is burning the volatile organic compounds in the stream, and decreasing the amount of outside fuel burned in the combustion unit, while the volatile organic compounds are being burned, by a sufficient degree to maintain the flue gas temperature within the predetermined range.

These and other objects and features of the present invention will become more fully apparent from the following description and appended claims taken in conjunction with the accompanying drawings.

BRIEF DESCRIPTION OF THE DRAWINGS

FIG. 2 is a graph plotting flue gas and adsorbent material temperatures over time to demonstrate the rapid heating process of an emission control system, which incorporates the present invention.

DESCRIPTION OF THE PREFERRED EMBODIMENTS

Figure 1:
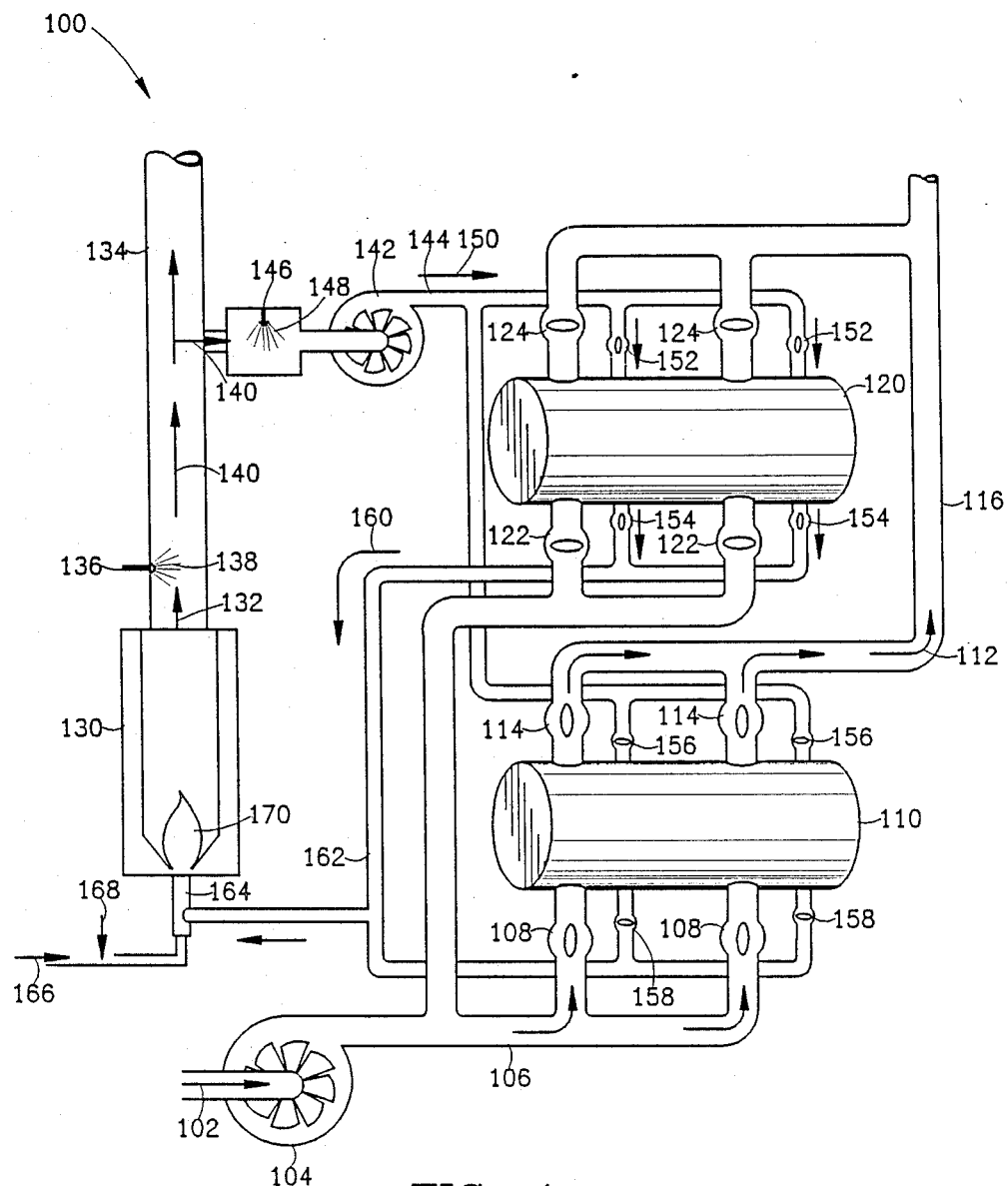
FIG. 1 is a schematic diagram of an emission control system for volatile organic compounds, which incorporates the present invention.

Reference is now made to the drawings wherein like parts are designated with like numerals throughout.

Turning now to the figures, FIG. 1 shows a volatile organic compound emission control system 100. The emission control system 100 removes and destroys volatile organic compounds, or VOCs, from contaminated gas streams which result from the operation of industrial plants such as, for example, semiconductor manufacturing facilities. The emission control system 100 shown in FIG. 1 has two concurrent cycles: an adsorption cycle and a regeneration cycle. The adsorption cycle will be discussed first.

In FIG. 1, a VOC contaminated gas stream 102 enters from an enclosed industrial plant (not shown). The contaminated gas stream 102 contains low levels of VOCs, typically less than 5% v/v, the volumetric ratio of VOCs to the contaminated gas stream 102. A first squirrel cage fan 104 creates an area of low pressure, causing the contaminated gas stream 102 to enter a set of adsorption cycle inlet pipes 106. The contaminated gas stream 102 progresses along the adsorption cycle inlet pipes 106 where it enters a first set of adsorption cycle inlet valves 108. In the adsorption cycle inlet valves 108 shown, the valves 108 are in the open position. The contaminated gas stream is then directed into a first adsorber 110. The adsorber 110 is a vessel which holds an adsorbent material (not shown). In a preferred embodiment, the adsorbent material is activated carbon. However, other types of adsorbent materials are known including activated clays, Fuller's Earth, aluminum oxide base materials, metal adsorbent chars, silica gels, magnesia base materials and zeolites (molecular sieves).

The VOCs in the contaminated gas stream 102 "stick" to the adsorbent material in the adsorber 110 by means of ionic attraction and/or surface phenomena. The resulting clean air stream 112 is directed through an open, first set of adsorption cycle outlet valves 114 and into a set of adsorption cycle outlet pipes 116 where it is safely vented to the atmosphere.

A second adsorber 120, shown in FIG. 1, is similar to the first adsorber 110; however in the emission control system 100 of FIG. 1, the second adsorber 120 is separated from the adsorption cycle described by closing a second set of adsorption cycle inlet valves 122 and a second set of adsorption cycle outlet valves 124. The adsorbent material (not shown) in the second adsorber 120 is saturated with concentrated VOCs and therefore is undergoing regeneration.

The second cycle in progress in FIG. 1 is a regeneration cycle. The regeneration cycle starts with a combustion unit 130 generating combustion products, or a flue gas 132, into a flue 134. The flue gas 132 emitted from the combustion unit 130 is extremely hot, typically around 1500° F. A first water injector 136 located in the flue 134, releases a first deionized water spray 138 into the hot flue gas 132. The resultant gas stream is a first stage humidified flue gas 140. The temperature of the humidified flue gas 140 is cooled, for example, to nearly 800° F.

A second squirrel cage fan 142, as depicted in FIG. 1, draws at least a portion of the humidified flue gas 140 into a set of regeneration cycle inlet pipes 144. The humidified flue gas 140 is then cooled, for example, to about 300° F. by a second water injector 146 located in the regeneration cycle inlet pipes 144, which releases a second deionized water spray 148. Thus, a second stage humidified flue gas 150 is produced. The humidified flue gas 150 is forced further into the regeneration cycle inlet pipes 144 and through an open, first set of regeneration cycle inlet valves 152. The regeneration cycle inlet valves 152 connect the regeneration cycle inlet pipes 144 to the second adsorber 120. An adsorbent material, such as activated carbon, stored inside the adsorber 120 is heated by the humidified flue gas 150.

To prevent the humidified flue gas 150 from heating the carbon in the first adsorber 110, a second set of regeneration cycle inlet valves 156, connecting the first adsorber 110 and the regeneration cycle inlet pipes 144, is closed. A second set of regeneration cycle outlet valves 158 is also closed to prevent any cross-leakage of gases between the two cycles inside of the first adsorber 110.

The heating of the carbon in the second adsorber 120 causes a stream of desorbed VOCs 160 to leave the activated carbon through the regeneration cycle outlet valves 158 and enter a set of regeneration cycle outlet pipes 162. The desorbed VOCs 160 are directed by the regeneration cycle outlet pipes 162 to a combustion unit fuel feed 164. Also entering the fuel feed 164 from an outside source (not shown) are a stream of combustion air 166 and a stream of natural gas 168. Although natural gas is preferred as an outside fuel, one skilled in the art will recognize that other types of similar fuels may be used. The fuel feed 164 meters the proper combination of natural gas 168, desorbed VOCs 160 and air 166 into the combustion unit 130 where the mixture is ignited forming a flame 170 and generating the flue gas 132.

It should be understood that the regeneration and adsorption cycles may not always be operating concurrently, as shown in FIG. 1. It should also be understood that either cycle may be applied to either of the two adsorbers 110, 120, and that the normal operation of the emission control system 100 is to allow one adsorber to become saturated with VOCs during the adsorption cycle and to later burn desorbed VOCs in a regeneration cycle. For example, to reverse cycles, the regeneration cycle valves 152, 154 connected to the second adsorber 120 are closed; the adsorption cycle valves 122, 124 connected to the second adsorber 120 are opened; the regeneration cycle valves 156, 158 connected to the first adsorber 110 are opened; and the adsorption cycle valves 108, 114 connected to the first adsorber 110 are closed. The use of two adsorbers simply provides the emission control system 100 with a capability to continuously remove VOCs from the contaminated gas stream 102.

FIG. 2 is a graph of typical humidified flue gas and adsorbent material, or carbon bed, temperatures during an exemplary regeneration cycle. The vertical axis defines temperature in °F. The horizontal axis defines time after regeneration cycle startup in minutes. The top curve, A, represents the temperature of the humidified flue gas 150 before it enters the regeneration cycle inlet valves 152. The next curve, B, represents the temperature of the humidified flue gas 150 above the adsorbent material in the adsorber 120. Curve C represents the temperature of the adsorbent material inside the adsorber 120. Curve D represents the temperature of the dew point inside the adsorber 120. The dew point is the temperature at which water will condense. It varies with the humidity of the flue gas.

Startup is the period of time between starting the regeneration cycle and reaching a steady state of VOC desorption. Initially, a pure natural gas is supplied to the combustion unit 130 to generate the flue gas 132. In the first twenty minutes of startup, the carbon bed is heated from room temperature ($\sim 76°$ F.) to a dew point of around 190° F. During this time the humid flue gas 150 is condensing moisture on the carbon bed. The gas inlet temperature (A) is maintained at a steady 300° F.

After the first twenty minutes of the particular run exemplified in FIG. 2, the gas inlet temperature (A) is raised over about a two minute period to about 400° F. This can be done simply by varying the amount of water injected into the flue gas. Since this raises the carbon bed temperature (C) above the dew point temperature (D), the carbon bed dries and from minute seventy on is at the temperature of superheated steam; e.g., above about 212° F. However, because the system of the present invention does not use steam, but rather humidified flue gas, a pressurized system is not required in order to generate these higher and more efficient gas temperatures. These higher temperatures not only permit more rapid desorption, they also permit a greater degree of regeneration. In other words, the amount of VOCs remaining in the bed after regeneration is substantially less than that remaining in a bed regenerated by steam at temperatures not exceeding 212° F.

At one hundred ten minutes the gas inlet temperature (A) is gradually decreased, allowing the superheated bed temperature (C) curve to flatten out.

In the particular process illustrated in FIG. 2, the carbon bed had a volume of approximately 20 cubic feet, and flue gas at the indicated temperatures was introduced at a rate of approximately 37 CFM. At the initiation of the process, the carbon was substantially saturated with VOCs in the form of Cellosolve Acetate (trademark for ethylene glycol monoethyl ether acetate, Union Carbide Corp.). The flue gas passed through the carbon bed represented approximately 50% of the total flue gas. A corresponding amount of make-up air was introduced into the burner to support combustion. The volume of natural gas introduced into the burner was regulated to maintain the temperature of the flue gas (prior to water injection) at an even 1500° F.

The temperature of the humid flue gas 150 is principally determined by the amounts and ratio of natural gas 168 to desorbed VOCs 160. This fuel mixture and the time required for regeneration can be determined in a number of ways relying on one or more sensors or timers providing feedback to the fuel feed 164. At least three types of sensors and process control can be employed.

In a first process control scheme, the clean air stream 112 from the adsorption cycle is monitored for VOC breakthrough, the point where some predetermined level of VOCs is not being sorbed by the adsorber 110. When VOC breakthrough occurs, the adsorption cycle for this bed is terminated. Subsequently, regeneration of that bed is commenced. When the VOC capacity of the bed is known, and breakthrough indicated that the bed is substantially saturated, a simple timer can be used to control the burner and the water injectors based on empirically derived process values. Alternatively, a microprocessor can access a table of sequenced fuel amounts to be metered by the fuel feed 164 and control the fuel feed 164 accordingly. In FIG. 1, such a breakthrough sensor (e.g., an infrared hydrocarbon sensor) would be located in the adsorption cycle outlet pipes 116.

A second type of process control utilizes an infrared detector to measure the amount of desorbed gas leaving the adsorber 120 during the regeneration cycle. In FIG. 1, such a sensor would be located in the regeneration cycle outlet pipes 162. The metering of natural gas into the burner can be decreased in proportion to the amount of desorbed gas measured by the sensor. In all of these embodiments, it is preferred that the desorbed VOCs become the only source of fuel in the burner after startup using natural gas.

In a third preferred embodiment, a sensor dynamically measures the temperature of the flue gas 132. As the temperature of the flue gas increases, the amount of natural gas 168 entering the fuel feed 164 can be decreased since desorbed VOCs 160 are now providing more combustion heat. After about twenty to thirty minutes, the natural gas 168 can be completely shut off. In FIG. 1, such a sensor would be located in the flue 134.

The temperature curves of FIG. 2 illustrate the use of process control to rapidly heat the carbon bed in the adsorber 120. The carbon bed would burn if the uncooled flue gas 132 (1500° F.) was contacted with the bed without prior cooling. Indeed, depending on the amount of oxygen in the humidified flue gas (which is generally less than about 5%), it is preferred that the temperature of flue gas that contacts the carbon bed be maintained below about 300° F. To prevent bed fires, but maximize amounts of desorbed VOCs 160, the optimal bed temperature is maintained in the range of from about 160° F. to about 280° F.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. An emission control process for removing and concentrating volatile organic compounds from a gas stream, in an apparatus including a combustion unit, a set of water injectors and a flue, comprising the steps of:
contacting said gas stream with an adsorbent material to remove said volatile organic compounds therefrom; and thereafter
burning an outside fuel in said combustion unit and discharging a combustion gas into said flue;
humidifying and cooling said flue gas with a stream of injected water introduced into said flue gas by said water injectors so as to provide a humidified flue gas;
condensing said humidified flue gas on said adsorbent material so as to release latent heat, thereby rapidly heating said adsorbent material until said adsorbent material reaches its dew point; and
continuing to heat said adsorbent material above its dew point to dry said adsorbent material, thereby releasing a stream of desorbed volatile organic compounds.

2. The emission control process defined in claim 1, wherein said injected water is deionized water.

3. The emission control process defined in claim 1, wherein said humidifying and cooling with said stream of injected water comprises the steps of:
injecting a first stream of water inside of said flue; and
injecting a second stream of water between said flue and said adsorbent material.

4. The emission control process defined in claim 3 wherein said first stream of water is injected in sufficient amount to generate said humidified flue gas at a first predetermined temperature and said second stream of water is injected into at least a portion of said humidified flue gas to reduce the temperature of said humidified flue gas to a second predetermined temperature prior to contacting said adsorbent material.

5. The emission control process defined in claim 1 wherein said adsorbent material is carbon.

6. The emission control process defined in claim 1, wherein said outside fuel is natural gas.

7. The emission control process defined in claim 1 wherein said humidified flue gas directed to said adsorbent material is only a portion of said flue gas.

8. The emission control process defined in claim 1, additionally comprising the steps of:
mixing said outside fuel and said stream of desorbed volatile organic compounds, thereby forming a gas mixture; and
burning said gas mixture in said combustion unit and discharging said combustion gas into said flue.

9. A method for controlling the regeneration of an adsorbent material having sorbed volatile organic compounds, in an apparatus including a combustion unit capable of burning both an outside fuel and desorbed volatile organic compounds from said adsorbent material, comprising the steps of:
burning said outside fuel in said combustion unit at a sufficient rate to provide a flue gas temperature exiting said combustion unit within a first predetermined range;
humidifying a portion of said flue gas so as to provide a humidified flue gas;
directing said humidified flue gas through said adsorbent material;
maintaining said flue gas temperature until said adsorbent material reaches its dew point so as to condense said humidified flue gas thereon;
increasing said flue gas temperature within a second predetermined range so as to dry said adsorbent material and to thereby generate a stream of desorbed volatile organic compounds leaving said adsorbent material;
directing said stream of desorbed volatile organic compounds into said combustion unit and burning said stream therein;
monitoring the flue gas temperature while said combustion unit is burning said volatile organic compounds in said stream; and
decreasing the amount of outside fuel burned in said combustion unit, while said volatile organic compounds are being burned, by a sufficient degree to maintain said flue gas temperature within said second predetermined range.

10. A solvent recovery process, in an apparatus having an adsorber to remove and concentrate volatile organic compounds from a gas stream, a combustion unit for burning both an outside fuel and volatile organic compounds to provide a hot flue gas to regenerate said adsorber, and a means to control said regeneration, comprising the steps of:

contacting said gas stream with an adsorbent material to remove said volatile organic compounds therefrom; and thereafter burning said outside fuel in said combustion unit at a sufficient rate to provide a flue gas temperature exiting said combustion unit within a predetermined range;

humidifying a portion of said flue gas so as to provide a humidified flue gas;

directing said humidified flue gas through said adsorbent material such that the latent heat of condensation is utilized to rapidly heat said adsorbent material so as to generate a stream of desorbed volatile organic compounds leaving said adsorbent material;

directing said stream of desorbed volatile organic compounds into said combustion unit and burning said stream therein;

monitoring the flue gas temperature while said combustion unit is burning said volatile organic compounds in said stream; and decreasing the amount of outside fuel burned in said combustion unit, while said volatile organic compounds are being burned, by a sufficient degree to maintain said flue gas temperature within said predetermined range.

11. The solvent recovery process defined in claim 10, wherein said humidifying step is accomplished by injecting a stream of water into said flue gas.

12. The solvent recovery process defined in claim 10, wherein said directing of said humidified flue gas includes a steady state period during which said humidified flue gas is maintained at a predetermined temperature above its dew point so that said humidified flue gas becomes superheated.

13. An adsorption/regeneration apparatus for removing and concentrating volatile organic compounds from a gas stream, comprising:

an adsorber having adsorbent material;

means for directing said gas stream through said adsorber to generate a clean air stream;

a combustion unit;

a flue to emit a flue gas from said combustion unit wherein said flue includes a conduit in gaseous communication with said adsorber for directing at least a portion of said flue gas to said adsorber;

one or more water injectors disposed in said flue for injecting a stream of water into at least a portion of said flue gas so as to cool said flue gas and provide a humidified flue gas;

means for directing said humidified flue gas through said adsorber wherein said humidified flue gas is condensed on said adsorbent material so as to release latent heat, thereby rapidly heating said adsorbent material until said adsorbent material reaches its dew point and thereafter raising the temperature of said humidified flue gas so as to heat said adsorbent material above its dew point and dry said adsorbent material and generate a desorbed gas stream;

means for burning an outside combustible gas stream, said desorbed gas stream, and mixtures thereof in said combustion unit; and means for mixing said outside gas and said desorbed gas for burning in said combustion unit.

14. The adsorption/regeneration apparatus defined in claim 13, additionally comprising:

a sensor to measure amounts of volatile organic compounds in said clean air stream output from said adsorber to determine when said adsorbent material is no longer effectively removing volatile organic compounds.

15. The adsorption/regeneration apparatus defined in claim 13, additionally comprising:

a sensor to measure amounts of volatile organic compounds in said desorbed gas stream to provide feedback to said mixing means.

16. The adsorption/regeneration apparatus defined in claim 15, wherein said sensor is an infrared detector.

17. The adsorption/regeneration apparatus defined in claim 13, additionally comprising:

a sensor to measure the temperature of said flue gas to provide feedback to said mixing means.

18. The adsorption/regeneration apparatus defined in claim 13, wherein:

said adsorbent material is contained in first and second adsorption chambers, so that material in one chamber can remove volatile organic compounds from said gas stream while said adsorbent material in the other chamber is regenerated.

19. The adsorption/regeneration apparatus defined in claim 13, wherein:

said water injectors include a first water injector to inject water inside said flue and a second water injector to inject water between said flue and said adsorber.

* * * * *